April 24, 1934.  J. G. VINCENT  1,955,880
CLUTCH MECHANISM
Filed Dec. 2, 1930
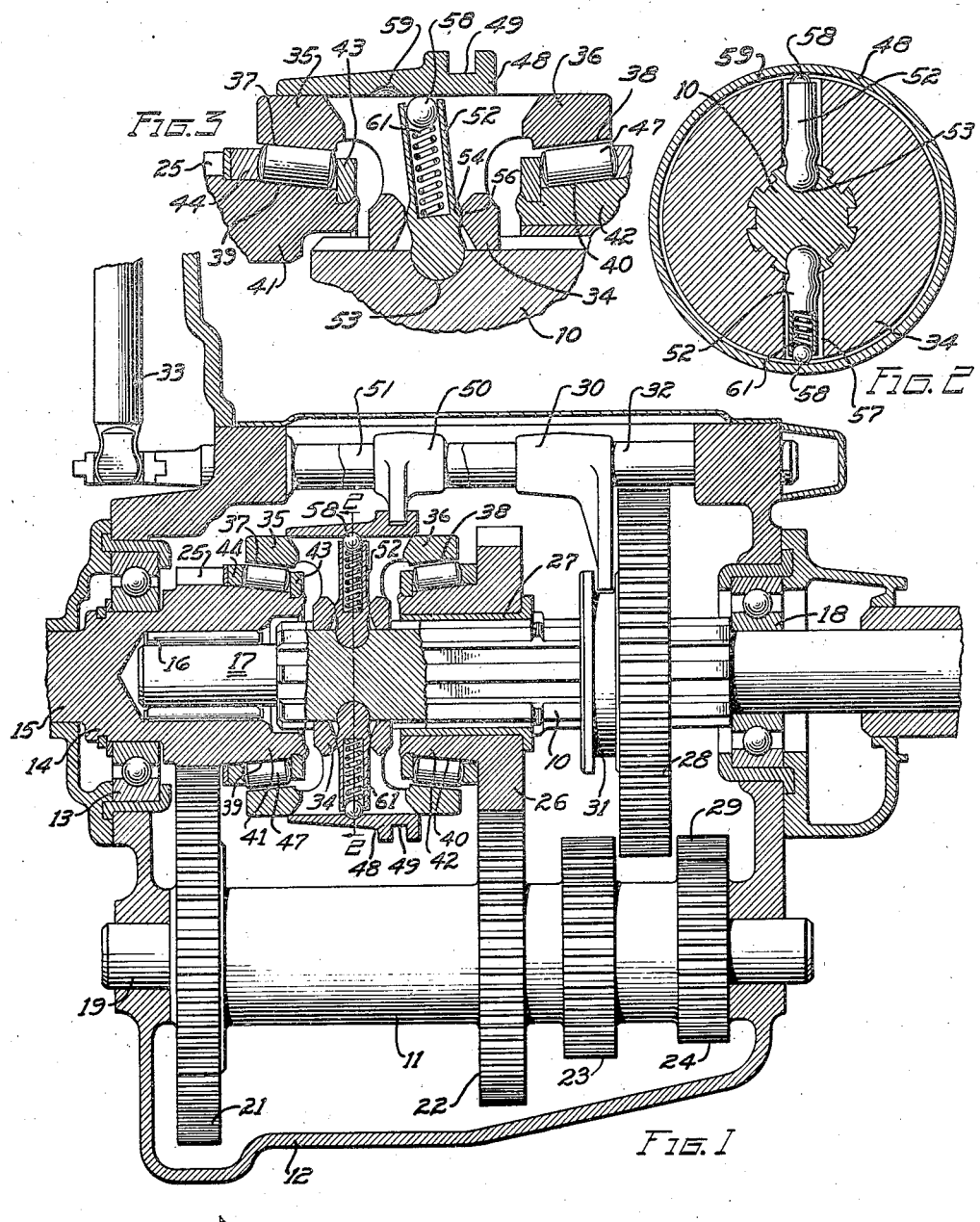
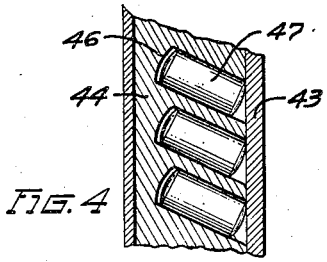
Inventor
JESSE G. VINCENT
By *Miller Tibbetts*
Attorney Patented Apr. 24, 1934

1,955,880

UNITED STATES PATENT OFFICE 1,955,880

CLUTCH MECHANISM

Jesse G. Vincent, Detroit, Mich., assignor to Packard Motor Car Company, Detroit, Mich., a corporation of Michigan Application December 2, 1930, Serial No. 499,513

15 Claims. (Cl. 192—47)

This invention relates to motor vehicles and more particularly to the transmission gearing of such vehicles.

In the operation of motor vehicles having conventional transmission gearing, after disconnection of the vehicle clutch and the previously meshed gears, the operator must either wait for a more rapidly moving gear element to lose speed, or in some instances must accelerate a more slowly moving gear by reconnecting it to the engine through the clutch. These maneuvers require a considerable measure of skill on the part of the operator and also prevent the free and rapid changing from one gear train to another as the exigencies of vehicle operation may dictate, so that gear changing has come to be considered as perhaps the most difficult task incident to the operation of a motor vehicle.

To assist the operator in making rapid and quiet gear changes it has been previously proposed to synchronize the gears to be meshed by various means, such as friction clutches. Such devices, however, have been open to certain objections. The mechanisms employed have been in general cumbersome and complicated, and the operating means difficult to operate and subject to excessive wear.

One of the objects of this invention is to provide a motor vehicle transmission having an improved device for changing or shifting the gears, which shall be simple and effective, and in which it is unnecessary to effect the meshing of teeth on those gear elements most frequently used and which rotate at different speeds.

Another object of the invention is to provide a motor vehicle transmission having clutch devices for connecting a designated gear train to the driven shaft so as to transmit torque thereto together with pressure multiplying means for engaging said devices with a predetermined pressure, and retaining them in engagement.

Another object of the invention is to provide a motor vehicle transmission which will permit the motor vehicle to free-wheel or coast while connected in the more frequently used gear ratios, whenever the speed of the vehicle is such that the driven member of the transmission has a greater speed than the driving member thereof.

Another object of the invention is to provide a motor vehicle transmission in which the higher gear elements are selectively connected to the driven shaft by overrunning roller clutches located between the shaft and the said elements.

A further object of the invention is to provide a motor vehicle transmission of the character designated in which the clutch devices are positively engaged and disengaged, and are retained in engagement during operation by a pressure component of the clutch engaging means.

Other objects of the invention will appear from the following description taken in connection with the drawing, which forms a part of this specification, and in which:

Fig. 1 is a view partially in side elevation and partially in longitudinal vertical section through a motor vehicle transmission embodying the present invention, the gear trains being shown in neutral position;

Fig. 2 is a transverse section taken substantially on the line 2—2 of Fig. 1;

Fig. 3 is an enlarged detailed view of part of the mechanism shown in Fig. 1, showing the transmission clutch engaged in high speed position, and Fig. 4 is a detail section showing the arrangement of the rollers in the clutches illustrated.

Referring to the drawing, in Fig. 1 is shown a motor vehicle transmission comprising a splined transmission shaft 10 and a countershaft or gear spool 11, mounted in a housing or transmission case 12. The front wall of the housing 12 carries a suitable bearing 13 in which is mounted the enlarged rear end 14 of a driving shaft 15, which may be the vehicle clutch shaft, driven from the vehicle engine through conventional clutch mechanism (not shown). The enlarged end 14 of the clutch shaft is formed with an axial recess for the reception of a bearing 16, in which the reduced forward end 17 of the transmission shaft 10 is journaled. The rear end of the shaft 10 is journaled in a bearing 18, supported in the rear wall of the housing 12, and is connected in the usual way to the propeller shaft to drive the vehicle, this connection not being shown.

The countershaft 11 is in the form of a hollow spool, mounted to rotate on an arbor 19 supported at its ends by the transmission case walls, and this spool is formed with a number of integral gears 21, 22, 23, and 24. Of these, the gear 21 is in constant mesh with a gear or pinion 25, formed on the enlarged end 14 of the shaft 15, so that the countershaft 11 is continuously connected to and driven from this clutch shaft 15 in the well known manner. The gear 22 is also continuously in mesh with a gear 26 which is mounted for rotation on a bearing sleeve 27, pressed or otherwise rigidly mounted on the shaft 10 as will be readily understood.

Gears 23 and 24 constitute the low speed and reverse gears respectively, and are adapted to drive a gear 28 which is splined to and slidable on the shaft 10, this gear 28 being directly engageable with the gear 23. It may also be driven from the gear 24 through a reverse idler pinion 29 in the well known manner. The sliding of gear 28 on shaft 10 is effected in the usual way by means of a shifter fork 30, which engages in a groove 31 in the body of the gear 28, this fork being actuated by a shifter rod 32 slidably mounted in suitable bearings in the upper part or cover portion of the casing 12. The shifter rod 32 is selectively actuated by a shift lever 33 of usual form which may be manually operated by the vehicle driver in the well known manner.

Thus in the illustrated embodiment of the invention, gear 28 may be moved to mesh with gear 23, to provide a first speed, or connected through pinion 29 to gear 24 to provide reverse. Second speed is provided by connecting the constant mesh gear 26 to the shaft 10, and third or high speed is secured by coupling the shafts 10 and 15, thus providing a direct drive.

To provide the second and high speed connections described, the forward portion of the shaft 10 is provided with a clutch device which is slidably secured to the shaft to rotate therewith between the gears 25 and 26. This constitutes a splined hub 34, the splines of which cooperate with the splines of shaft 10, and which has axially extending portions 35 and 36 on which are formed oppositely disposed conical surfaces 37 and 38 respectively. These surfaces are arranged to overhang similarly inclined surfaces 39 and 40, which are formed respectively on extensions 41 and 42 on the end of the shaft portion 14 and on the body of gear 26. The circumferential edges of these surfaces are provided with end flanges or stops 43, as clearly shown in Fig. 4. Between each of the pairs of cooperating conical surfaces is arranged a movable clutch element which is preferably of the skewed roller type such as is shown and described for example, in the United States Patent No. 1,670,197 to Humfrey. This includes a suitable race 44 having slots 46 inclined to the direction of rotation of the race. A cylindrical roller 47 is disposed in each of the slots 46 between the conical surfaces, as the surfaces 37 and 39, with its axis skewed by reason of the inclination of the slot to the axis of the cone. This arrangement constitutes a well known type of roller clutch, in which each of the rollers is wedged between and connects the cone surfaces in one direction of relative rotation, and releases these surfaces in the other direction, depending on the direction in which the roller axes are inclined.

Engagement of either clutch device is secured by sliding the hub member 34 in that direction to bring the surfaces 37, or the surfaces 38 as desired, into contact with the associated roller assembly. For this purpose, the hub 34 is surrounded by an actuating sleeve 48, having a shifter groove 49 in which is engaged a fork 50, similar to the fork 30. The fork 50 is actuated by a shifter rod 51 which may be selectively engaged by the gear lever 33.

Axial movement of the sleeve 48 is communicated to the hub 34 by means of levers 52 fulcrumed at their inner end in recesses or sockets 53 in the shaft 10, and having intermediate abutment portions 54 adapted to contact corresponding abutments 56 on the hub 34. These levers 52 extend through suitable slots 57 in the hub member 34. They are formed hollow and carry at their outer ends ball contacts 58, these balls being adapted to seat in suitable notches 59 formed in the sleeve 48. The balls are urged outward toward the sleeve and thereby retained in their notches 59, by springs 61, one of which is disposed in each of the hollow levers 52. By means of this connection, excessive axial thrust between the elements of the clutch devices is avoided, being limited by the strength of the springs 61, which yield upon a predetermined pressure and permit the balls to be depressed and ride out of their notches, as shown in Fig. 3. When in this position, a component of the spring pressure acts to retain the clutch elements in engagement with a firm but not excessive pressure so that this connection compensates for any indeterminate throw of the hub member, such as might be caused by manufacturing variations, or by wear of the parts.

Movement of the sleeve in the other direction permits the ball to snap back into the notch 59, after which the hub 34 is positively retracted by the levers 52, disengaging the direct drive clutch and leaving the transmission in neutral as shown in Fig. 1. It will be understood that similar movement on the right side of the neutral position operates the clutch for the second speed gear in a similar manner.

It will be evident that this invention provides a device in the operation of which there is no meshing of toothed elements, and that accordingly the changing of gears between direct drive and second speed, the speeds most frequently used, is quiet and efficient regardless of the vehicle speed at which such changing is effected. Moreover, because of the increase in pressure secured by operation of the levers 52, the clutch elements are positively engaged and disengaged with a predetermined pressure, and are retained in engagement during operation of the device without extra effort of any kind by the vehicle driver.

The feature of free-wheeling or coasting in the higher gears is automatically secured by reason of the over-running of the roller clutch devices whenever the speed of the hub member 34 exceeds the speed of the driving member 39 or 42 as the case may be.

The invention may, of course, be readily applied to the low and reverse gear trains if desired, and may be used in connection with four-speed and other transmission systems as well as with the conventional transmission described.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. In a transmission having a driving member and a driven shaft, clutch means comprising a driving cone on said member, a hub member rotatably secured to the shaft and slidable thereon having a driven cone, skewed rollers mounted on the driving cone and engageable by the driven cone to transmit torque to the driven shaft, and yieldable means to slide said hub member to engage the rollers and the driven cone.

2. In a transmission having a driving member, a driven member and a roller clutch slidably movable into engagement between said members, a hub axially movable to engage said clutch, levers adapted to move said hub at an increased pressure, and yieldable means associated with said levers to limit said pressure.

3. In a transmission having a driving member, a driven shaft, a hub member splined to the shaft, a one-way clutch between the hub member and the driving member, levers fulcrumed on the shaft and engaging said hub, an actuating member for said levers having notches in the plane of the levers, spring-pressed balls carried by the levers and engaging in said notches to positively move said hub to engage the clutch and to maintain said engagement with a predetermined pressure.

4. In a transmission having a driving means and a driven shaft, clutch means comprising a clutch member having a hub slidably mounted on the shaft, a shifter sleeve telescoping the clutch member, hollow levers engaging the shaft and extending through the hub, springs in the levers, and balls in the outer ends of the levers engaging the sleeve, said springs exerting pressure against the balls in a direction toward the sleeve.

5. In a transmission having a driving means and a driven shaft, clutch means comprising a clutch member having a hub slidably mounted on the shaft, a shifter sleeve telescoping the clutch member, said sleeve having detents in its inner face, hollow levers extending through the hub member and anchored to the driven shaft, springs in the levers and balls engageable in the detents in the sleeve, said springs exerting pressure against the balls in a direction toward the sleeve.

6. In a transmission having a driving means and a driven shaft, clutch means comprising a clutch member engageable with the driving means and having a hub slidably mounted on the shaft, hollow levers extending through the hub and anchored to the shaft, a sleeve telescoping the clutch member and having detents in the inner face thereof, means reciprocable in the outer ends of the levers and engageable with the detents in the sleeve, and pressure means in the levers holding the reciprocable means in engagement with the sleeve.

7. In a transmission having driving means and a driven shaft in axial alignment, clutch means comprising a clutch member engageable with the driving means and having a slotted hub slidably mounted on the shaft, a shifter sleeve telescoping the clutch member and slidably mounted relative thereto, said sleeve having detents in the inner face thereof, oscillatory levers anchored to the shaft and extending through the slots in the hub, and spring pressed reciprocable means in the outer ends of the levers engageable in the detents in the sleeve.

8. In a transmission having a driving means and a driven shaft, clutch means comprising a clutch member having a hub slidably mounted on the shaft, a shifter sleeve telescoping the clutch member, hollow levers engaging the shaft and extending through the hub, spring means in the outer ends of the levers, and means in the outer ends of the levers against which the spring means bear engaging the sleeve.

9. In a transmission having a driving means and a driven shaft, clutch means comprising a clutch member having a hub slidably mounted on the shaft, a shifter sleeve telescoping the clutch member and having detents in its inner face, levers extending through the hub member and anchored to the driven shaft, spring pressed means carried by the levers and engageable in the detents in the sleeve.

10. In a transmission having a driving means and a driven shaft, clutch means comprising a clutch member having a hub slidably mounted on the shaft, a shifter sleeve telescoping the clutch member, oscillatory levers engaging the shaft and extending through the hub, spring means in the outer ends of the levers, and means in the outer ends of the levers against which the spring means bear engaging the sleeve.

11. In a transmission having a driving means and a driven shaft, clutch means comprising a clutch member having a hub slidably mounted on the shaft, a shifter sleeve telescoping the clutch member and having detents in its inner face, oscillatory levers extending through the hub member and anchored to the driven shaft, and spring pressed means carried by the levers and engageable in the detents in the sleeve.

12. In a transmission having driving means and driven means, a connecting means for the driving and driven means comprising an overrunning roller clutch adapted to transmit torque to but not from the driven means, and yieldable means including levers each having a spring-pressed ball to engage said clutch with a predetermined pressure.

13. In a transmission mechanism having a driven shaft and a driving shaft, a combination of a roller clutch device between the driving member and the shaft adapted to permit overrunning of the shaft, and mechanism including lever means engageable with the clutch under a predetermined pressure irrespective of speed or shifting force.

14. In a transmission mechanism comprising a driving member, a driven shaft, a one-way clutch between said member and said shaft, oscillating levers carried by said shaft, means yieldably mounted on the levers and engageable with said clutch to maintain engagement therewith at a predetermined pressure and means associated therewith to actuate said levers.

15. In a transmission mechanism having a driven shaft, a driving shaft and a transmission gear continuously rotatable with said driving shaft, the combination of rollers carried by the gear for transmitting torque in one direction only, an axially shiftable hub splined to the driven shaft and engageable with the rollers, and means including levers to shift said hub axially with a predetermined pressure.

JESSE G. VINCENT.